(12) United States Patent
Cobb

(10) Patent No.: US 9,755,221 B2
(45) Date of Patent: Sep. 5, 2017

(54) CO-EXTRUDED CONFORMAL BATTERY SEPARATOR AND ELECTRODE

(71) Applicant: Palo Alto Research Center Incorporated, Palo Alto, CA (US)

(72) Inventor: Corie Lynn Cobb, Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 13 days.

(21) Appl. No.: 14/751,826

(22) Filed: Jun. 26, 2015

(65) Prior Publication Data

US 2016/0380254 A1    Dec. 29, 2016

(51) Int. Cl.
   *H01M 4/04*   (2006.01)
   *B05C 5/02*   (2006.01)
   (Continued)

(52) U.S. Cl.
   CPC ............. *H01M 4/0411* (2013.01); *B05C 5/02* (2013.01); *B05C 5/0254* (2013.01); *B29C 47/00* (2013.01);
   (Continued)

(58) Field of Classification Search
   None
   See application file for complete search history.

(56) References Cited

U.S. PATENT DOCUMENTS 3,195,865 A    7/1965  Harder
3,382,534 A    5/1968  Veazey
(Continued)

FOREIGN PATENT DOCUMENTS

EP    0490294 A1   6/1992
EP    0802034      10/1997
(Continued)

OTHER PUBLICATIONS

Fergus et al., "Recent Developments in Cathode Materials for Lithium Ion Batteries," Journal of Power Sources, Elsevier SA, Ch. vol. 195, No. 4, Feb. 15, 2010, pp. 939-0954 XP026693512.
(Continued)

*Primary Examiner* — Dah-Wei D Yuan
*Assistant Examiner* — Jethro M Pence
(74) *Attorney, Agent, or Firm* — Marger Johnson

(57) ABSTRACT

A co-extrusion print head has at least one separator inlet port, at least a first, second and third series of channels arranged to receive a separator material from the separator inlet port, at least one electrode inlet port, a fourth series of channels arranged to receive an electrode material from the electrode inlet port, a first merge portion connected to the first, second, third and fourth series of channels, the merge portion positioned to receive and merge the separator material into a separator flow and the electrode material into an electrode flow, a second merge portion connected to the first merge portion, the second merge portion positioned to receive and merge the separator flows and the electrode flows, and an outlet port connected to the second merge portion, the outlet port arranged to deposit the separator and electrode materials from the merge portion as a stack on a substrate.

10 Claims, 16 Drawing Sheets

(51) Int. Cl.
    *B29C 47/00*     (2006.01)
    *B29C 47/02*     (2006.01)
    *B29C 47/06*     (2006.01)
    *B29C 47/14*     (2006.01)
    *H01M 2/14*     (2006.01)
    *H01M 2/16*     (2006.01)

(52) U.S. Cl.
    CPC .......... *B29C 47/025* (2013.01); *B29C 47/062* (2013.01); *B29C 47/065* (2013.01); *B29C 47/14* (2013.01); *H01M 2/145* (2013.01); *H01M 2/1673* (2013.01); *H01M 2/1686* (2013.01)

(56) References Cited

U.S. PATENT DOCUMENTS

| | | | |
|---|---|---|---|
| 3,556,833 A | 1/1971 | Nirenberg | |
| 3,583,678 A | 6/1971 | Harder | |
| 3,694,132 A | 9/1972 | Bunte | |
| 3,752,616 A | 8/1973 | Matsui et al. | |
| 3,797,987 A | 3/1974 | Marion | |
| 3,860,036 A | 1/1975 | Newman, Jr. | |
| 3,949,970 A | 4/1976 | ter Braak | |
| 4,112,520 A | 9/1978 | Gilmore | |
| 4,222,671 A | 9/1980 | Gilmore | |
| 4,348,346 A | 9/1982 | Thompson | |
| 4,511,528 A | 4/1985 | Kudert et al. | |
| 5,094,793 A | 3/1992 | Schrenk et al. | |
| 5,143,681 A | 9/1992 | Daubenbuchel et al. | |
| 5,154,934 A | 10/1992 | Okamoto | |
| 5,398,372 A | 3/1995 | Kush | |
| 5,628,950 A | 5/1997 | Schrenk et al. | |
| 5,843,385 A | 12/1998 | Dugan | |
| 5,851,562 A | 12/1998 | Haggard et al. | |
| 5,882,694 A | 3/1999 | Guillemette | |
| 6,109,006 A | 8/2000 | Hutchinson | |
| 6,676,835 B2 | 1/2004 | O'Connor et al. | |
| 6,981,552 B2 | 1/2006 | Reddy et al. | |
| 7,090,479 B2 | 8/2006 | Kegasawa et al. | |
| 7,690,908 B2 | 4/2010 | Guillemette et al. | |
| 7,700,019 B2 | 4/2010 | Lavoie et al. | |
| 7,765,949 B2 | 8/2010 | Fork et al. | |
| 7,780,812 B2 | 8/2010 | Fork et al. | |
| 7,799,371 B2 | 9/2010 | Fork et al. | |
| 7,883,670 B2 | 2/2011 | Tonkovich et al. | |
| 7,922,471 B2 | 4/2011 | Fork et al. | |
| 8,117,983 B2 | 2/2012 | Fork et al. | |
| 8,206,025 B2 | 6/2012 | Natarajan | |
| 2002/0074972 A1 | 6/2002 | Narang et al. | |
| 2002/0176538 A1 | 11/2002 | Wimberger-Friedl et al. | |
| 2003/0111762 A1 | 6/2003 | Floyd et al. | |
| 2003/0189758 A1 | 10/2003 | Baer et al. | |
| 2007/0108229 A1* | 5/2007 | Fork | B05B 9/06 222/129 |
| 2007/0110836 A1* | 5/2007 | Fork | B29C 47/026 425/133.5 |
| 2007/0279839 A1 | 12/2007 | Miller | |
| 2008/0067712 A1* | 3/2008 | Osada | B29C 47/0021 264/171.1 |
| 2010/0003603 A1 | 1/2010 | Chiang et al. | |
| 2010/0239700 A1 | 9/2010 | Winroth | |
| 2011/0110836 A1 | 5/2011 | Rong et al. | |
| 2012/0153211 A1 | 6/2012 | Fork et al. | |
| 2012/0156364 A1 | 6/2012 | Fork et al. | |
| 2013/0020737 A1 | 1/2013 | Ulcej | |

FOREIGN PATENT DOCUMENTS

| | | |
|---|---|---|
| EP | 1757429 | 2/2007 |
| EP | 2056352 | 5/2009 |
| EP | 2466594 | 6/2012 |
| FR | 1308573 | 11/1962 |
| JP | 9183147 | 7/1997 |
| JP | 2006326891 | 12/2006 |
| WO | 0121688 | 3/2001 |

OTHER PUBLICATIONS

European Search Report, dated Apr. 14, 2014, EP Application No. 13198599.6, 7 pages.

\* cited by examiner

CO-EXTRUDED CONFORMAL BATTERY SEPARATOR AND ELECTRODE

STATEMENT REGARDING FEDERALLY SPONSORED RESEARCH AND DEVELOPMENT

This invention was made with Government support under Award Number DE-AR0000324 awarded by DOE, Office of ARPA-E. The Government has certain rights in this invention.

TECHNICAL FIELD

This disclosure relates to fabricating batteries, more particularly fabricating batteries using a co-extrusion apparatus.

BACKGROUND

The use of a co-extrusion apparatus to manufacture various structures has been discussed in several patent applications and issued patents. A co-extrusion apparatus is one in which two or more materials are extruded simultaneously into a structure of some kind. This type of apparatus can be used in fabrication of batteries, simultaneously extruding electrodes with separators to form components of batteries.

Examples of the co-extrusion approaches include US Patent Publication 20120156364, in which interdigitated fingers of co-extruded materials are extruded from one print head type of apparatus. The materials are fed into feeding channels and combined as separate flows, then split and combined again until a structure of alternating stripes of the two materials is created as they exit the print head. In another approach, the side-by-side lateral structure extends to interdigitated stripes in the vertical direction as well. US Patent Publication 20140186519 teaches a means to generate this type of structure.

The use of these structures to fabricate batteries is discussed in other publications, such as U.S. Pat. No. 5,714,278, in which a masked portion of the area of a porous separator material used in a battery. Masked areas can be formed on the porous separator material and allows for easier alignment of the anode and cathode sections to avoid edge effects. However, these areas are not formed in co-extrusion print heads.

US Patent Publication No. 20110217585 discusses batteries having integrated separators and methods of fabricating such batteries. The separators are formed in different ways, but generally formed directly on either the cathode or anode. The separators may be single layer or multi-layered. These approaches do not form the electrodes and separators simultaneously in an extrusion manner.

Another approach uses electrophoretic deposition in sequential layers to form thin-film batteries. The sequential layers are formed using electrophoretic deposition. An example of this approach is shown in US Patent Publication 20130244102.

None of these approaches form the electrodes and separators simultaneously using a co-extrusion print head. These types of print heads have several advantages in their simplicity, their simultaneous deposition capability, but none exist that can form separator structures simultaneously with the electrodes. Because they are not formed simultaneously, the separator cannot be formed to be truly conformal to the electrode. Having a conformal separator provides a layer around the electrode to prevent the battery from shorting.

SUMMARY

An embodiment consists of a co-extrusion print head that has at least one separator inlet port, at least a first, second and third series of channels arranged to receive a separator material from the separator inlet port, at least one electrode inlet port, a fourth series of channels arranged to receive an electrode material from the electrode inlet port, a first merge portion connected to the first, second, and third series of channels, the merge portion positioned to receive and merge the separator material into separator flow and the electrode material into an electrode flow, a second merge portion connected to the first merge portion, the second merge portion positioned to receive and merge the separator flows and the electrode flows, and an outlet port connected to the second merge portion, the outlet port arranged to deposit the separator and electrode materials from the merge portion as a stack on a substrate where the separator material covers the top and sides of the electrode material.

DETAILED DESCRIPTION OF THE EMBODIMENTS

Figure 1:
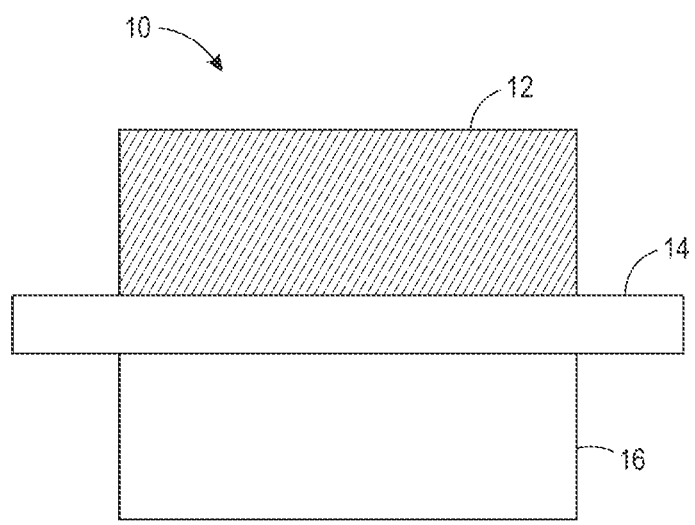
FIG. 1 shows a prior art embodiment of a battery.

In a typical battery, the separator's primary function prevents physical contact between the anode and cathode while facilitating ion transport. This discussion will refer to the anode and cathode as electrodes. FIG. 1 shows a prior art embodiment of a battery 10 with cathode 16, anode 12 and separator 14. During cell assembly, the separator has a larger area than that of either electrode. The process cuts the separator into a larger size than the anode and cathode electrodes. When inserted into a full cell assembly, the larger separator prevents edge/side contact between the electrodes.

Figure 2:
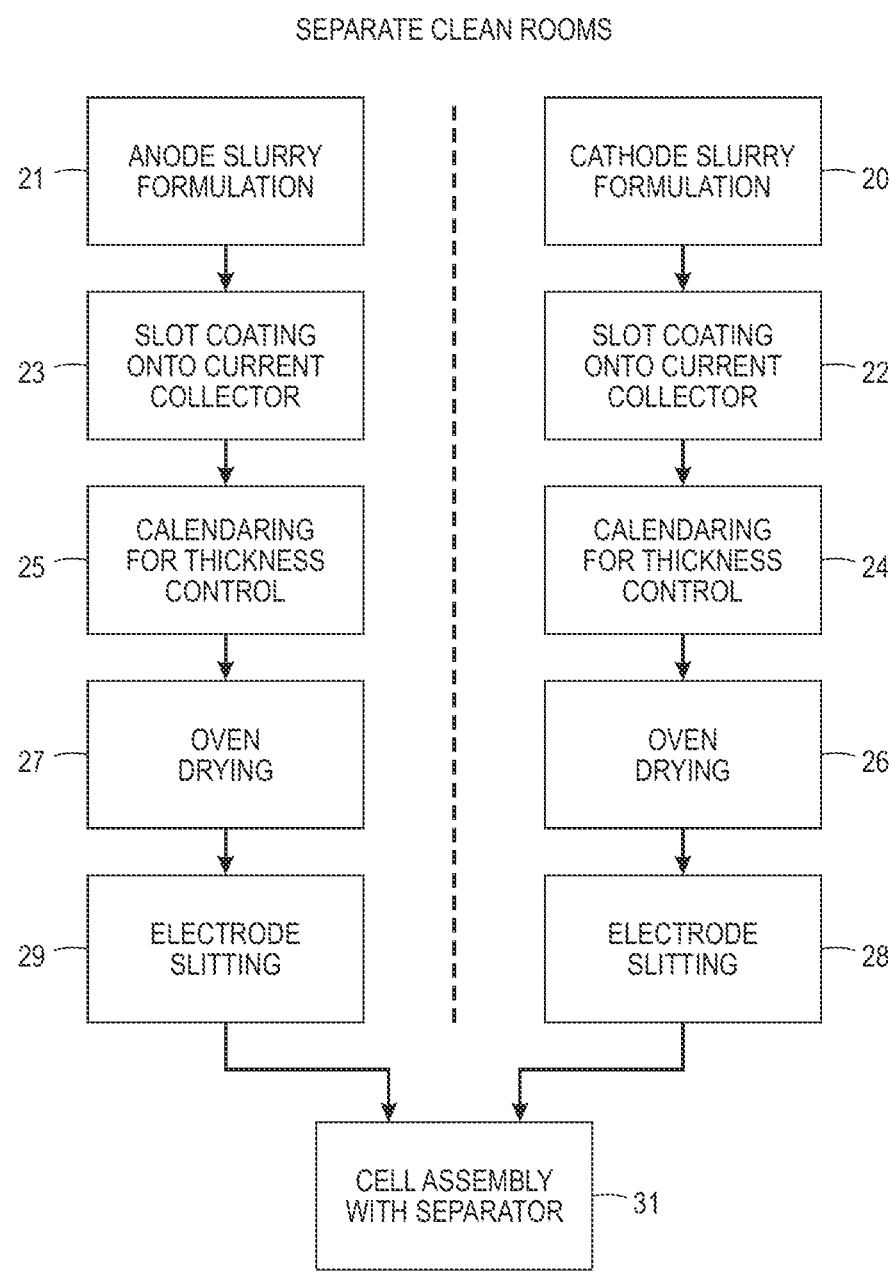
FIG. 2 shows a prior art embodiment of a process flow for manufacture of a battery.
Figure 3:
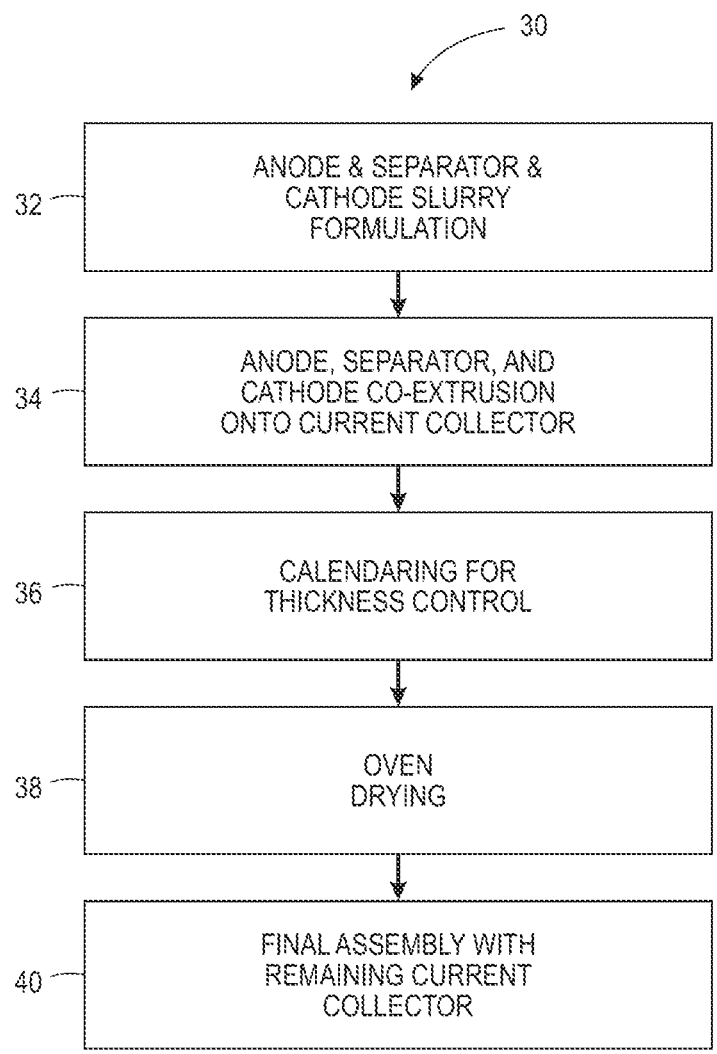
FIG. 3 shows a prior art embodiment of a process flow for manufacture of a battery.

FIG. 2 shows an example of a conventional battery manufacturing process for creating a full cell consisting of an anode, a cathode and a separator. As one can see, the process manufactures the anode in one clean. The process produces an anode slurry formation at 21, then slot coats it onto a current collector at 23, with calendaring for thickness control at 25. The process then dries the anode at 27. Similarly, the process forms a cathode slurry at 20, then slot coats it onto the current collector at 22 with calendaring for thickness control at 24. The cathode is dried at 26. Both electrodes undergo slitting at 29 and 28. Electrode slitting typically involves slitting a roll of electrode materials to a desired width. The final cell is then assembled at 31.

In the embodiments here, the process 30 forms the anode, cathode and separator slurries at 32. The three slurries are then co-extruded using the print head disclosed here at 34 onto a current collector with calendaring for thickness control at 36. The combination of the structures are dried at 38. The remaining current collector is then assembled with the extruded structure at 40.

Figure 4:
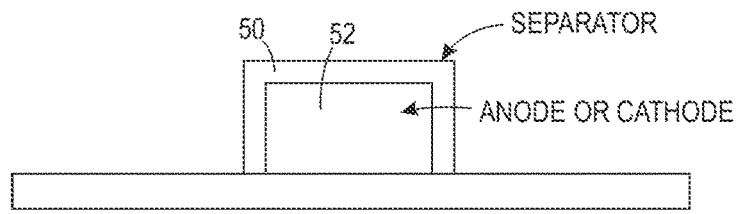
FIGS. 4-7 show embodiments of a battery electrode having a conformal separator.

FIGS. 4-7 show embodiments of battery structures manufacturable with the co-extrusion print head described here. In FIG. 4 the electrode 52 has a conformal separator that covers the top and sides of the electrode. Conformal, as that term is used here, means that the separator molds itself to the electrode. The electrode 42 may consist of a single material as in electrode 52. Alternatively, the electrode may consist of an interdigitated structure 56 shown in FIG. 5. The interdigitated structure may result from the co-extrusion print head as discussed in the previous patents mentioned above.

Figure 6:
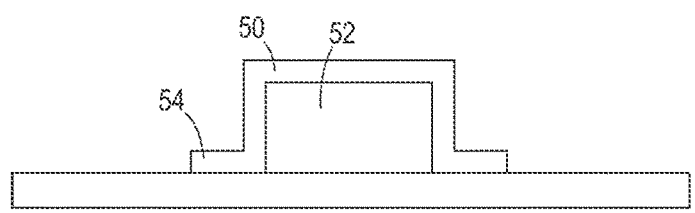
Figure 7:
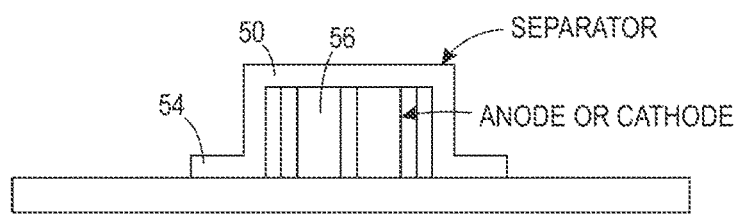

In FIGS. 6 and 7, the separator conforms to the electrodes, but in addition to only covering the top and sides of the electrode, it also extends onto the current collector. This provides additional separation between the anode and cathode. In FIG. 6, the separator 50 conforms to the electrode 52 with extensions such as 54. FIG. 7 shows the similar structure, but the electrode consists of an interdigitated electrode 56.

After the manufacture of these structures, they mate with the remaining electrode to form a full cell which is then cut or wound into the appropriate format. One can see that the co-extrusion enables a conformal separator to be fabricated around an electrode, while current manufacturing processes use a separator sheet cut to size in an area larger than the electrodes, leaving room for potential shorting at the sides during final cell assembly.

Figure 8:
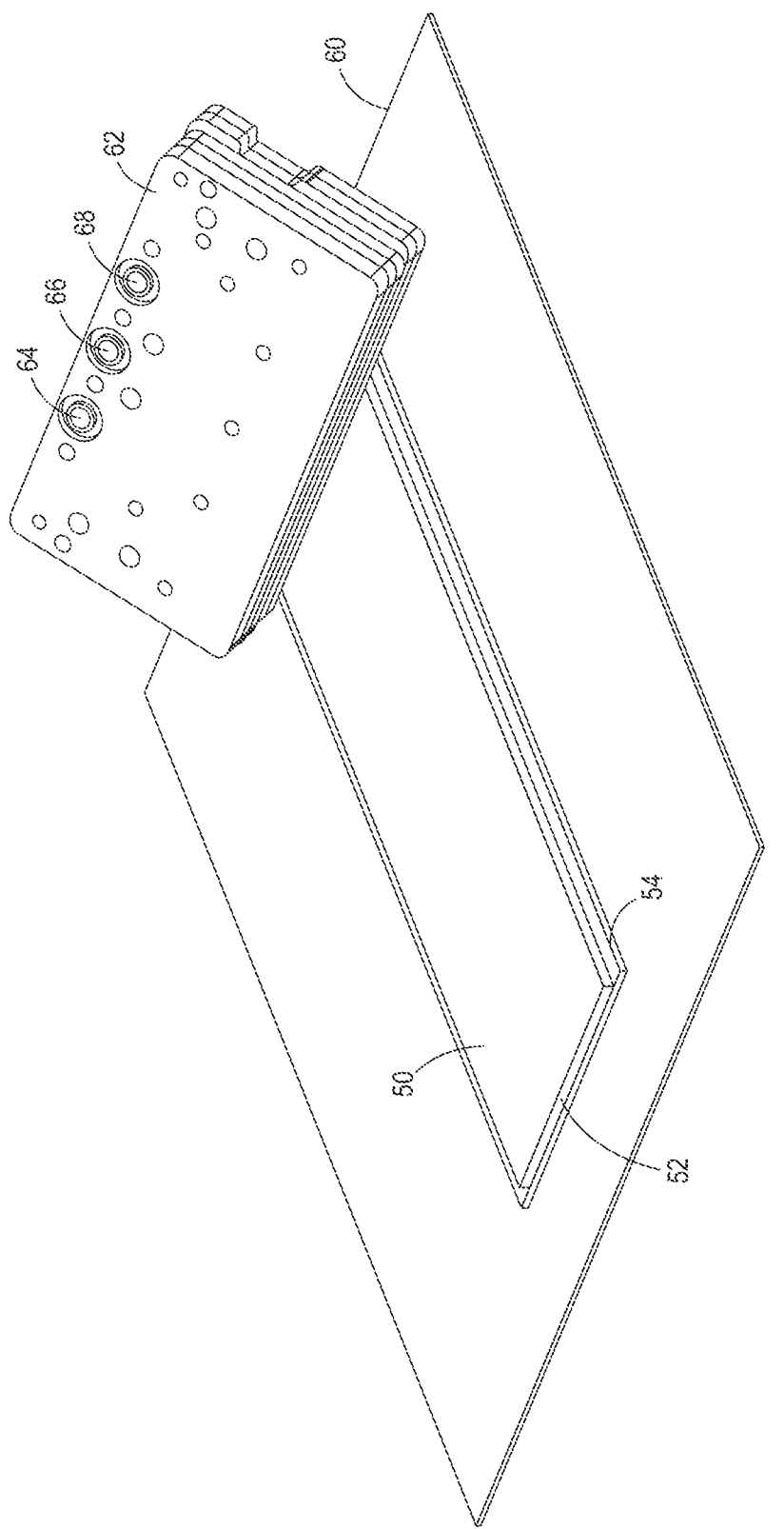
FIG. 8 shows an embodiment of a print head capable of forming stacked materials in one pass.

FIG. 8 shows an embodiment of a print head 62. The print head 62 extrudes the structures as viscous slurries onto a target substrate 60. The materials may require drying or firing to remove the solvent and densify the structures. As shown in FIG. 8, the inlet ports 64, 66 and 68 receive slurries that eventually exist the print head in a manner to form the electrode 52, or interdigitated electrode 56, and separator 50, with or without the extension 54.

Figure 9:
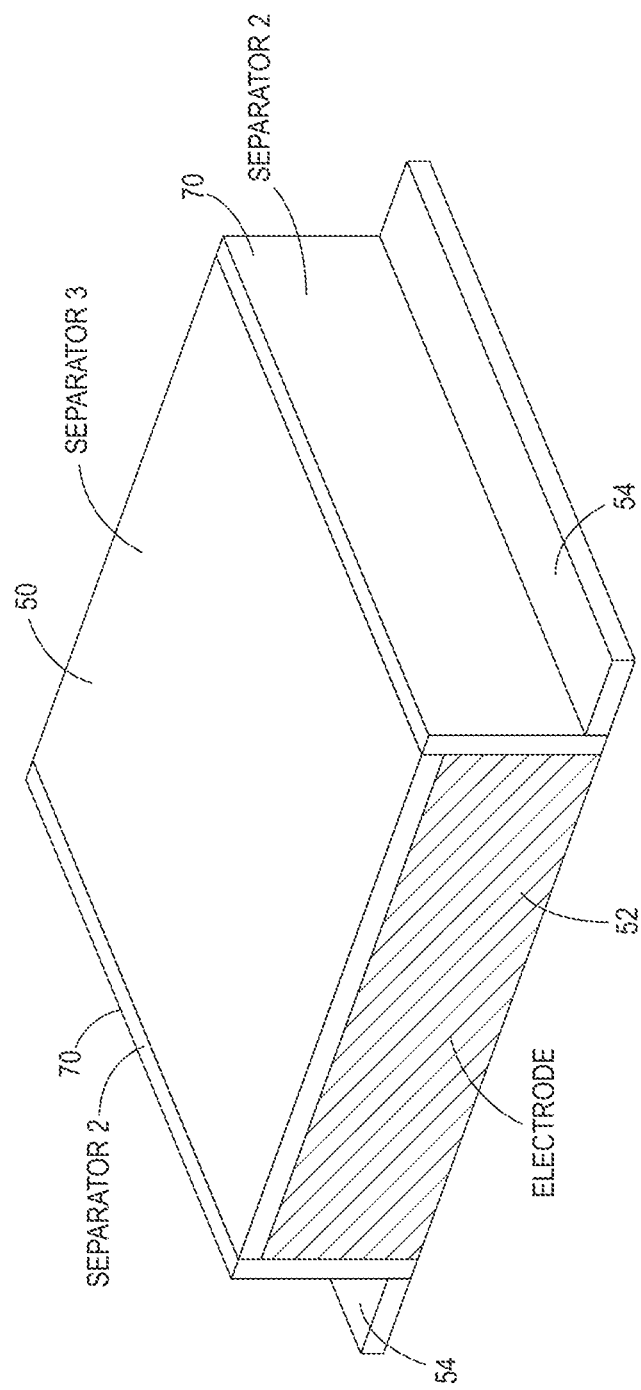
FIG. 9 shows an embodiment of a battery electrode having a conformal separator.

The print head of FIG. 8, or a similar structure, can form the structures of FIGS. 4-7. Fluid paths and manifolds in the print head distribute separator and electrode slurries or inks. One can break down the structure of FIG. 6 into zones, as shown in FIG. 9. The electrode material 52 exits from one set of nozzles in the print head, as will be discussed in FIGS. 10-12. The separator may consist of three different zones. The extension 54 may consist of one slurry, referred to here as S1. The sides 70 may consist of another slurry, referred to here as S2. The top layer 50 may consist of another slurry, S3. These slurries may all feed from the same slurry, forming a uniform layer over the electrode. Alternatively, the slurries may be different materials, to enable better isolation or enhance other characteristics of the batteries. The flows and feeds can be controlled as will be discussed in more detail later.

Figure 10:
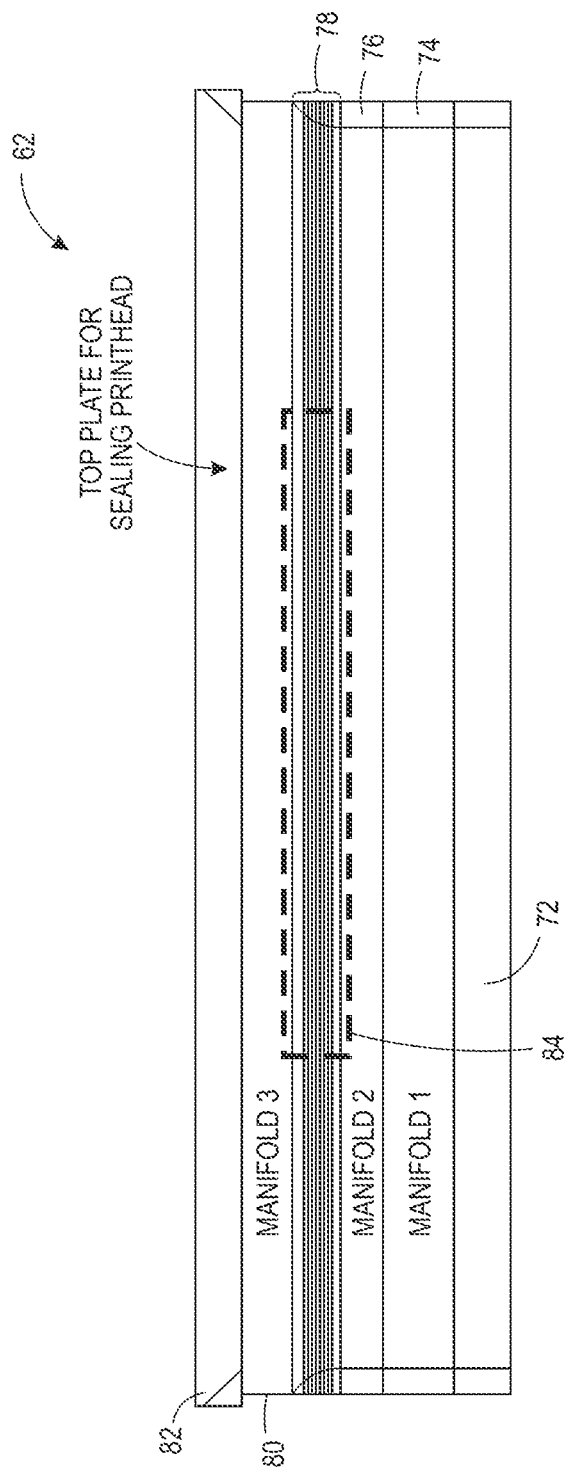
FIGS. 10-15 show views of one embodiment of a print head capable of forming stacked layers on a substrate in one pass.

FIG. 10 shows a side view of one embodiment of a print head 62. The print head has a top plate 82 that seals the print head and a back fixture plate for aligning parts 72. The ink enters through the back plate 72 and feeds into the nozzles through manifolds 74, 76, and 80, depending upon the material. One should note that the ink may move 'away' from the front of the page and flow into the output nozzles from the manifold 80. The stack of nozzle plates 78 form the extrusion nozzles through which the slurries ultimately exit the print head.

Figure 11:
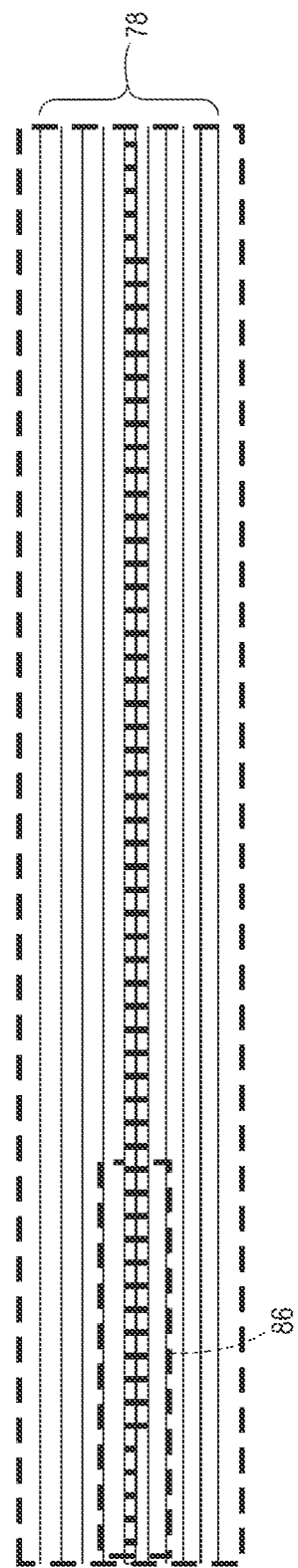

FIG. 11 shows a closer view of a portion 86 from the extrusion nozzles 78 from FIG. 10. The portion 86 is show in more detail in FIG. 12. The orientation of the print head is important to understand the configuration of the resulting structure. The substrate, which may consist of the current collector, is on the 'top' of the print head and the materials exit the print head with the electrode material E existing the nozzles such as 94 being on the substrate first, then covered by the separator slurry S3 from nozzle 96, with the separator slurry S2 from nozzles such as 92. The separator slurry S1 exits the print head at nozzles such as 90 and comes out onto the substrate in the same position as the electrode material. Walls such as 98 in the print head keep the materials isolated as they exit the interdigitation portion of the print head into a merge portion.

Figure 5:
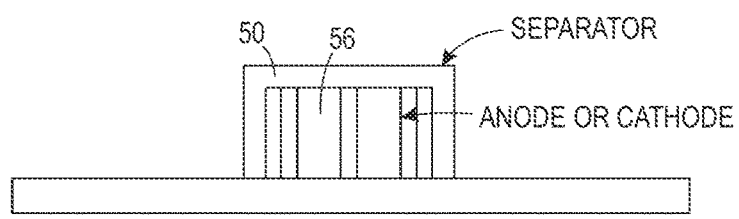
Figure 12:
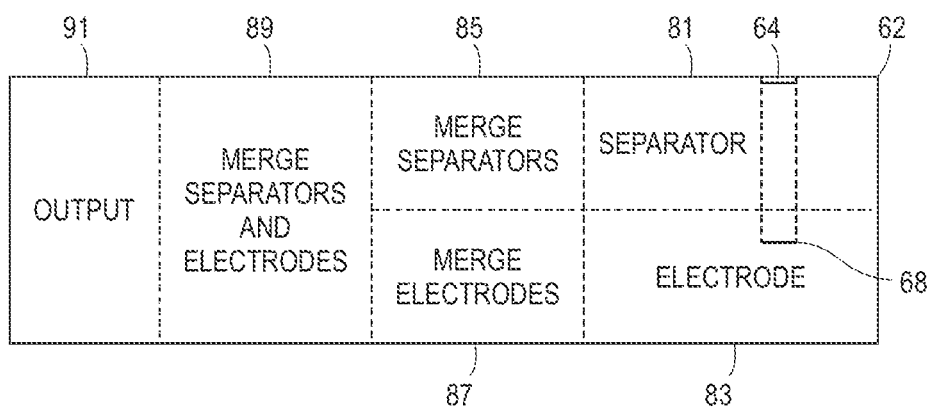
Figure 13:
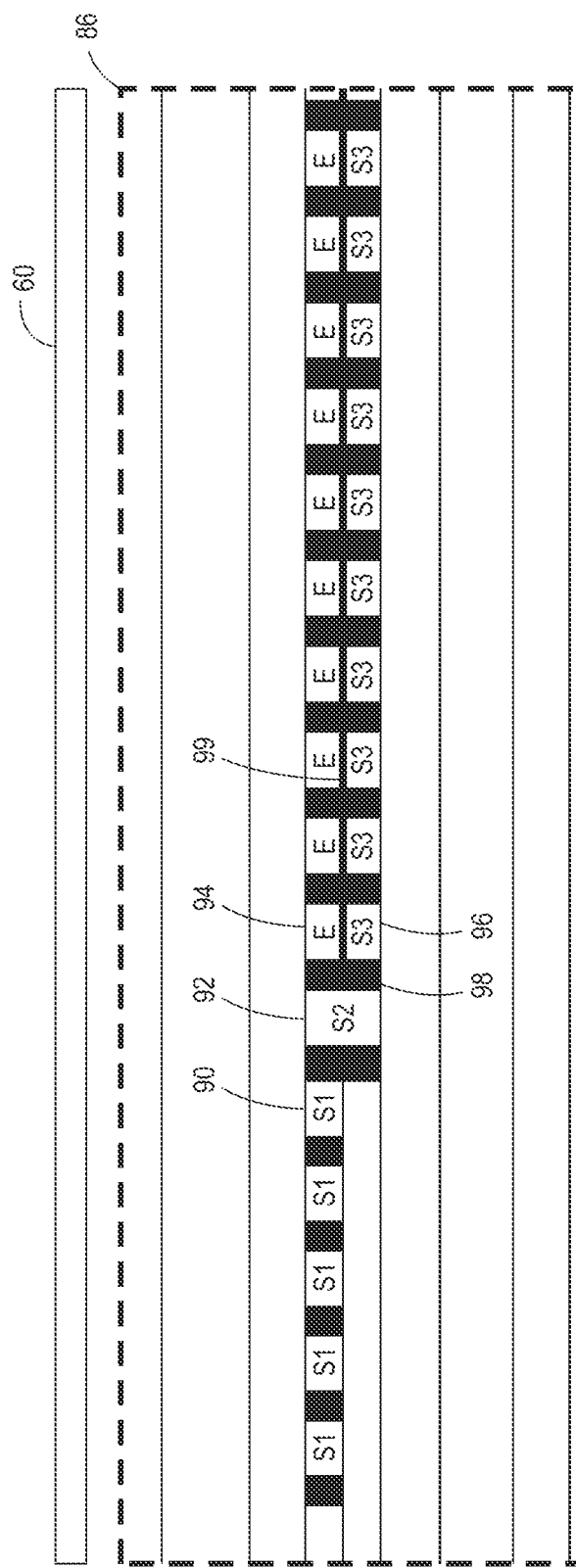

FIG. 13 shows the individual slurries separated from each other, the separator slurries and the electrode slurries are separated amongst themselves and from each other. The discussion of FIGS. 13-15 may be better understood with reference to FIG. 12. In FIG. 12, the print head 62 is shown in a block diagram. The print head has the inlet ports such as 64 for the separator slurry and 68 for the electrode slurry. The first portion of the print head has sections 83 and 81 for the electrode and separator slurries to be received. A first merge portion 85 then allows the separator slurries to merge into a separator flow and a separate portion 87 of the first merge portion to allow the electrodes to merge into an electrode flow. A second merge portion 89 then allows the separator flows and the electrode flows to merge together into one flow prior to exiting the print head at the output 91. These are shown in FIGS. 14 and 5 are from the perspective of looking back from the outlet towards the nozzles from which the slurries flow.

Figure 14:
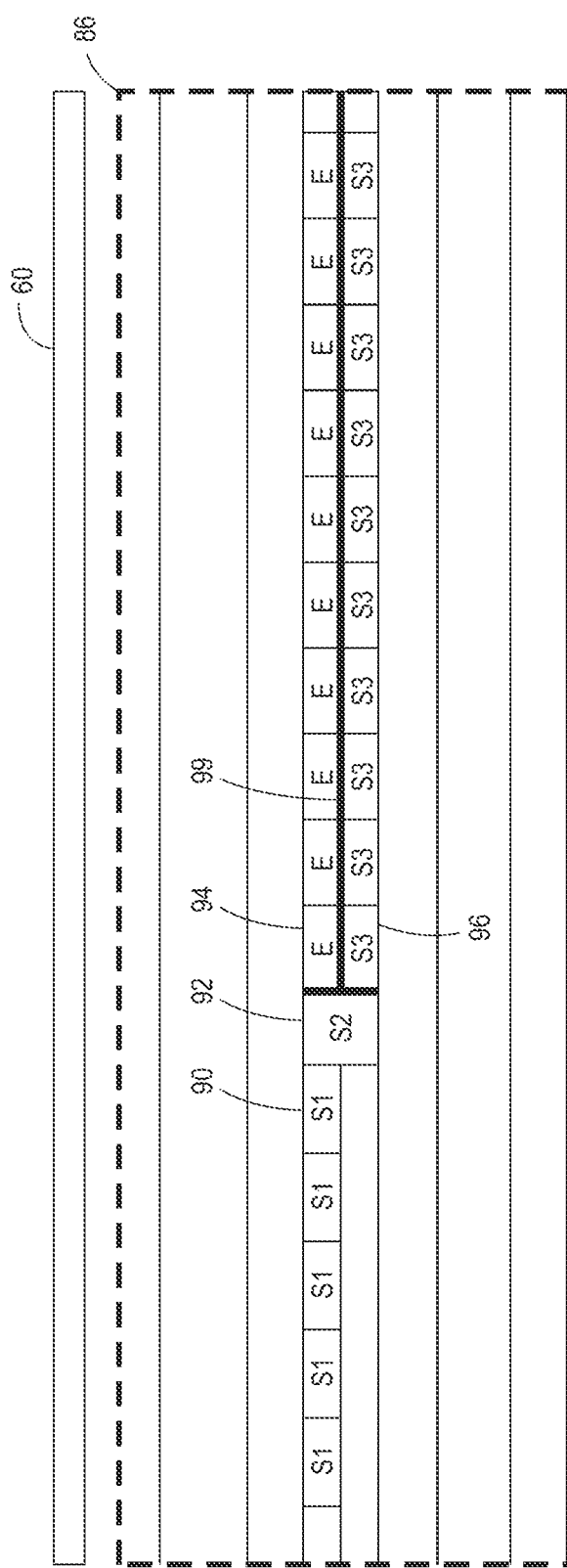
Figure 15:
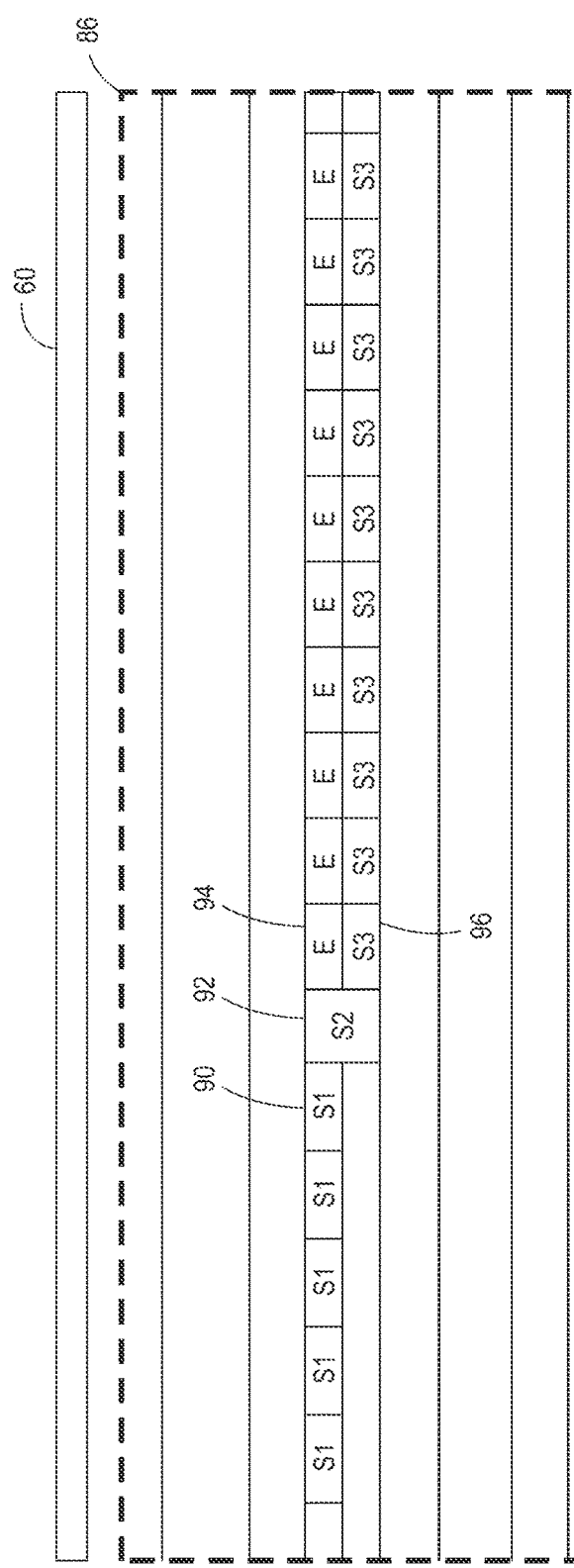

In FIG. 14, the slurries have traversed a first merge portion so the all of the separator 'S' slurries are merged together and all the 'E' slurries are merged together, but the 'S' slurries and 'E' slurries are still separate from each other. In FIG. 15, the 'S' slurries and 'E" slurries have merged. Note that this all occurs within the print head, and the resulting set of slurries exit the print head as merged flows, and the merged flows are in contact with each other but do not mix.

Figure 16:
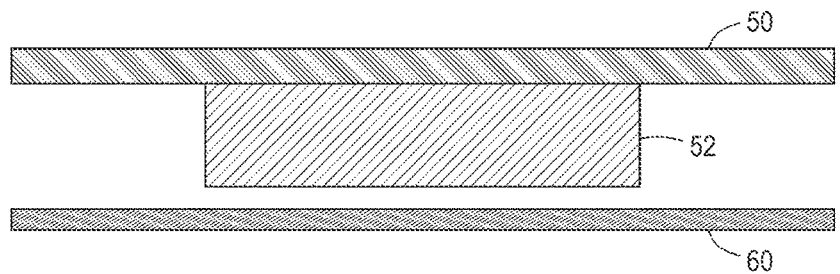
FIGS. 16-18 show a process of formation of a conformal separator.
Figure 17:
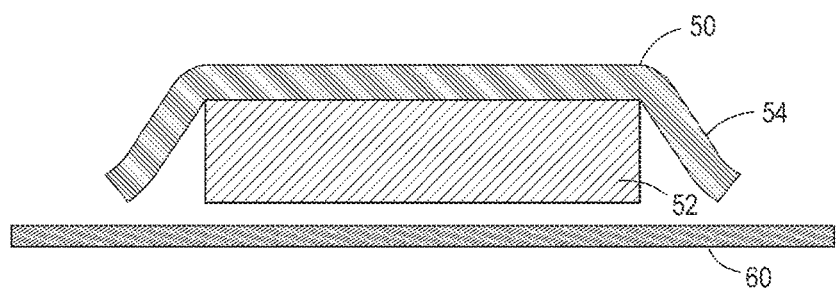
Figure 18:
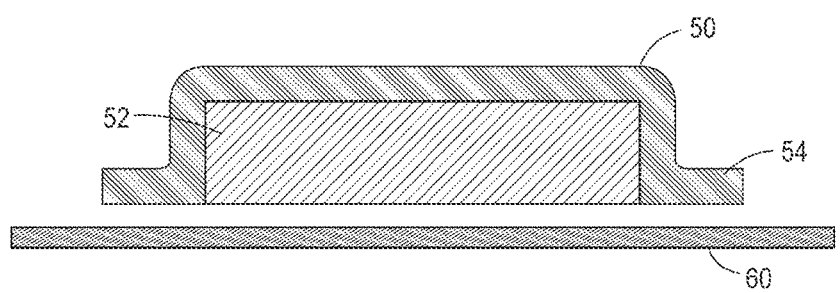

FIGS. 16-17 illustrate a method of operation in which a layer of separator material that is wider than the electrode material. In these figures, the materials are being extruded in a direction either going into or out of the page. The separator material 50 is distributed into nozzles on top of and to the sides of the electrode material, forming a 'wider' stripe than the electrode material. This may be accomplished without using the larger nozzles such as 92 shown in FIG. 13.

Just before the materials exit the print head, the separator material 50 is 'higher' than the electrode material relative to the substrate 60. As the materials exit the print head, the separator material 50 begins to flow over electrode material 52 because it is no longer supported in the print head. Upon coming to rest on the substrate 60, the separator 50 settles over the electrode material and forms the extensions 54. The portion of the separator 50 that forms the extensions 54 will depend upon how many nozzles are used for the separator beyond the nozzles used for the electrode materials.

Figure 19:
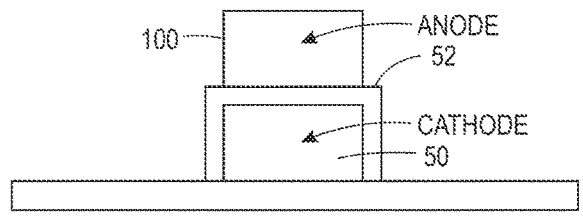
FIGS. 19-22 show embodiments of a battery having a conformal separator.
Figure 20:
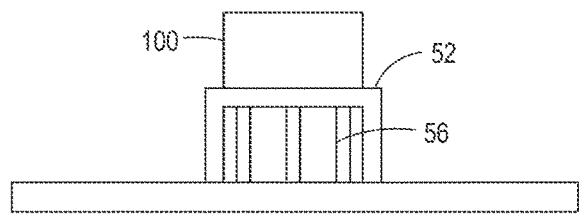
Figure 21:
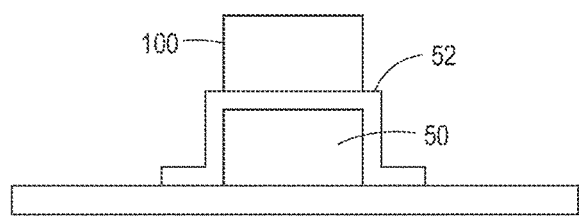
Figure 22:
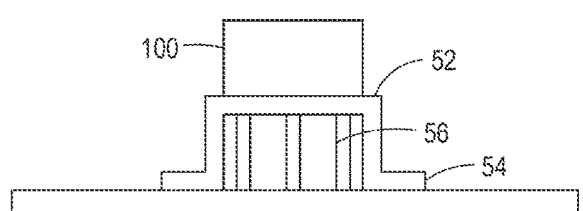

FIGS. 19-22 show alternative embodiments of the battery structures having another layer on top of the top layer of separator S3. Typically, this layer will be a second top layer of separator, but may also consist of electrode material of the type opposite the first electrode. In FIG. 19, the electrode 52 has the separator 50 formed on top of it. In this embodiment, the opposite electrode 100 is formed on top of the separator 50. FIG. 20 shows the embodiment similar to FIG. 19, but with the interdigitated electrodes 56. FIGS. 21 and 22 show the embodiments with an anode added to the separator that has extensions 54 with and without the interdigitated electrodes.

Figure 23:
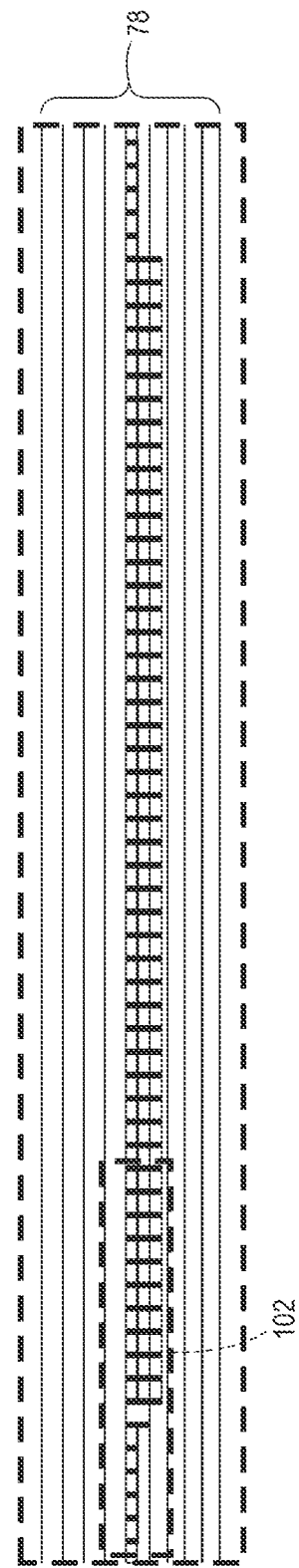
FIGS. 23-24 show an embodiment of a print head having a separator formed of multiple layers.
Figure 24:
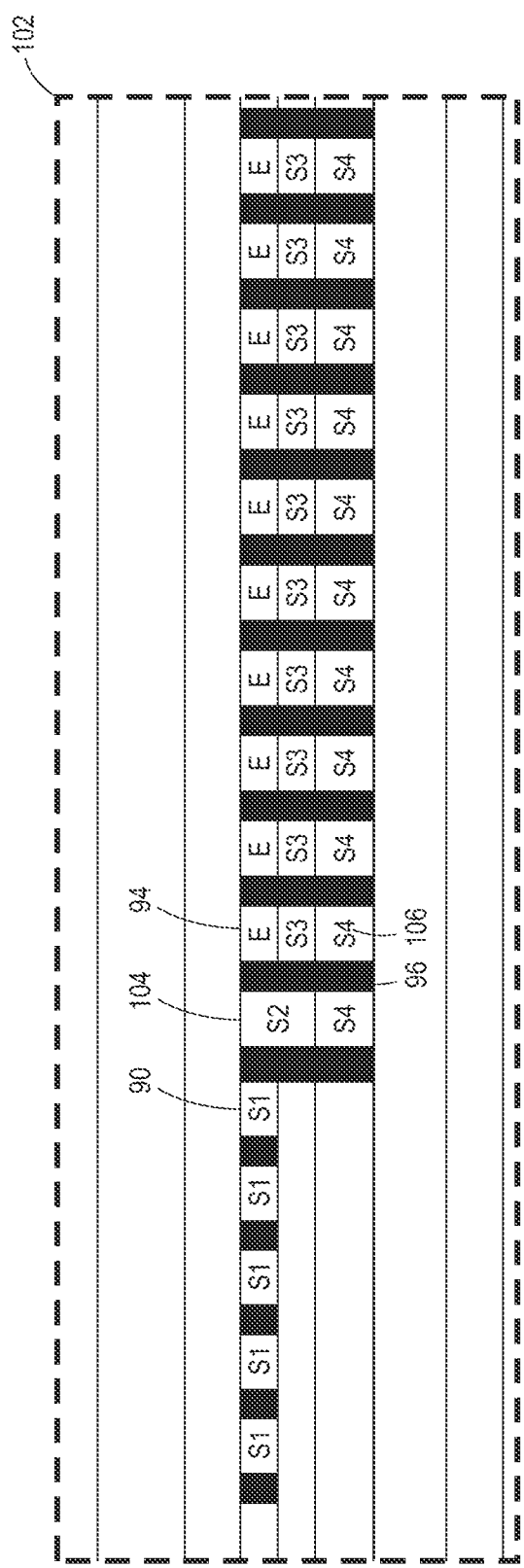

FIG. 23 shows an alternative embodiment of a print head. In this embodiment, the stack of plates 78 includes an extra set of extrusion nozzles. An exploded view of the portion 102 of the plates 78 is shown in FIG. 24. In this embodiment, the channels 104 that dispense the separator S2 on the substrate next to the electrode material are larger than the previous S2 channels. The nozzles 96 through which the slurry S3 exits the print head now have another set of nozzles adjacent them, such as 106. In this particular embodiment, the channels such as 106 dispense a fourth slurry S4 enables a multilayer composite separator.

In one embodiment, S3 and S4 consist of different separator materials. After drying, the S3 and S4 materials would have different materials, such a different porosity, insulating or thermal properties, etc. As previously mentioned, it is also possible that the additional slurry may be an electrode material that is of an opposite type of the first-used electrode material E. For example, if E is an anode material, S4 would be cathode material, or the opposite.

In this manner, co-extrusion print heads can fabricate a conformal separator around an electrode structure in a single pass. The conformal separator reduces shorting in a battery cell, ensuring safer batteries. The embodiments here remove the need to cut separator sheets larger than an electrode as a separator process. The electrode-separator structure can be reduced to a desired width, reducing the need for a slitting operation used in conventional battery manufacturing.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A co-extrusion print head, comprising:
   at least one separator inlet port;
   at least a first, second and third series of channels arranged to receive a separator material from the separator inlet port;
   at least one electrode inlet port;
   a fourth series of channels arranged to receive an electrode material from the electrode inlet port;
   a first merge portion connected to the first, second, third and fourth series of channels, the first merge portion positioned to receive and merge the separator material into a separator flow and the electrode material into an electrode flow, wherein the separator flow and the electrode flows are vertically stacked;
   a second merge portion connected to the first merge portion, the second merge portion positioned to receive and merge the separator flows and the electrode flows; and
   an outlet port connected to the second merge portion, and outlet nozzles, the outlet port arranged to deposit a portion of the separator material and the electrode material from the second merge portion as a stack on a substrate through the nozzles, where the portion of the separator material covers the top of the electrode material and other portions of the separator material covers the sides of the electrode material, where at least one nozzle for the separator material portion is larger than other nozzles.

2. The co-extrusion print head of claim 1, wherein the at least one separator inlet port comprises three separator inlet ports.

3. The co-extrusion print head of claim 1, wherein the at least one electrode inlet port comprises two electrode inlet ports.

4. The co-extrusion print head of claim 3, wherein the electrode material comprises two electrode materials.

5. The co-extrusion print head of claim 4, wherein the fourth series of channels are further arranged to receive two electrode materials.

6. The co-extrusion print head of claim 5, wherein the first merge portion is arranged to receive the two electrode materials.

7. The co-extrusion print head of claim 6, wherein the outlet port is arranged to deposit the two electrode materials as interdigitated stripes covered by the separator material as the materials exit the print head.

8. The co-extrusion print head of claim 1, further comprising a fifth series of channels arranged to receive an additional material, the fifth series of channels connected to the second merge portion, and the outlet port arranged to deposit the additional material on top of the separator material.

9. The co-extrusion print head of claim 8, wherein the additional material comprises an additional separator material.

10. The co-extrusion of print head of claim 8, wherein the additional material is a second electrode material of a type opposite the electrode material.

* * * * *